US009514613B2

(12) United States Patent
Oles et al.

(10) Patent No.: US 9,514,613 B2
(45) Date of Patent: Dec. 6, 2016

(54) GAMING DEVICE HAVING A GRADUATED MULTIPLIER PAYOUT IN A SECONDARY GAME

(71) Applicant: IGT, Las Vegas, NV (US)

(72) Inventors: David M. Oles, Henderson, NV (US); Aaron T. Jones, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 14/930,255

(22) Filed: Nov. 2, 2015

(65) Prior Publication Data

US 2016/0055720 A1 Feb. 25, 2016

Related U.S. Application Data

(60) Continuation of application No. 13/732,769, filed on Jan. 2, 2013, now Pat. No. 9,174,120, which is a (Continued)

(51) Int. Cl.
*G06F 17/00* (2006.01)
*G07F 17/32* (2006.01)
*A63F 9/24* (2006.01)

(52) U.S. Cl.
CPC ............. *G07F 17/3267* (2013.01); *A63F 9/24* (2013.01); *G07F 17/32* (2013.01); *G07F 17/3209* (2013.01)

(58) Field of Classification Search
None
See application file for complete search history.

(56) References Cited

U.S. PATENT DOCUMENTS 5,000,453 A * 3/1991 Stevens ..................... A63F 1/12 273/149 R
5,356,145 A * 10/1994 Verschoor ................. A63F 1/12 273/149 R (Continued)

FOREIGN PATENT DOCUMENTS

AU 199716432 9/1997
AU A-50327/96 10/1997

(Continued)

OTHER PUBLICATIONS

American Thunder Screen Shots written by IGT, published in 1998 (4 pages).

(Continued)

*Primary Examiner* — Paul A D'Agostino
(74) *Attorney, Agent, or Firm* — Neal, Gerber & Eisenberg LLP

(57) ABSTRACT

An apparatus and method for a secondary game of a wagering gaming system, and particularly the increase of an award in the secondary game by the value of different multipliers associated with different amounts wagered in a primary game. A secondary game provides a total award to a player based on the multiplier associated with the wagered amount in the primary game by applying the multiplier to the amount of the award earned by the player in the secondary game. A particular wagerable amount may be associated with a multiplier that is predetermined, or randomly selected from a group of predefined multipliers, or selected from a group based on a probability. The range of possible combinations of wagerable amounts and multipliers are displayed to the player in the base game to provide an incentive to maximize the wager.

20 Claims, 15 Drawing Sheets

Related U.S. Application Data division of application No. 12/030,720, filed on Feb. 13, 2008, now Pat. No. 8,360,848, which is a continuation of application No. 10/452,388, filed on Jun. 2, 2003, now Pat. No. 7,338,370.

(56) References Cited

U.S. PATENT DOCUMENTS 5,722,893 A * 3/1998 Hill ............ A63F 1/14 273/149 R
5,762,552 A 6/1998 Vuong et al.
5,823,874 A 10/1998 Adams
5,944,310 A * 8/1999 Johnson ............ A63F 1/12 273/149 R
5,989,121 A 11/1999 Sakamoto
6,004,207 A 12/1999 Wilson, Jr. et al.
6,039,650 A * 3/2000 Hill ............ A63F 1/14 273/149 R
6,135,884 A 10/2000 Hedrick et al.
6,149,521 A 11/2000 Sanduski
6,155,925 A 12/2000 Giobbi et al.
6,159,097 A 12/2000 Gura
6,173,955 B1 1/2001 Perrie et al.
6,186,894 B1 2/2001 Mayeroff
6,224,483 B1 5/2001 Mayeroff
6,231,442 B1 5/2001 Mayeroff
6,299,536 B1 * 10/2001 Hill ............ A63F 1/14 463/11
6,334,814 B1 1/2002 Adams
6,358,147 B1 3/2002 Jaffe et al.
6,416,408 B2 7/2002 Tracy et al.
6,443,452 B1 * 9/2002 Brune ............ G07F 17/32 273/143 R
6,468,156 B1 10/2002 Hughs-Baird et al.
6,471,208 B2 10/2002 Yoseloff et al.
6,558,253 B1 * 5/2003 DeSimone ............ G07F 17/3244 273/143 R
6,561,904 B2 5/2003 Locke et al.
6,582,301 B2 * 6/2003 Hill ............ A63F 1/14 273/149 R
6,589,115 B2 * 7/2003 Walker ............ G07F 17/3244 273/138.1
6,648,759 B2 11/2003 Vancura
6,719,630 B1 4/2004 Seelig et al.
7,258,611 B2 8/2007 Bigelow, Jr. et al.
2001/0007828 A1 * 7/2001 Walker ............ G07F 17/3244 463/26
2002/0022514 A1 2/2002 Randall et al.
2002/0034976 A1 3/2002 Webb
2002/0063389 A1 * 5/2002 Breeding ............ A63F 1/12 273/292
2002/0068635 A1 * 6/2002 Hill ............ A63F 1/14 463/47
2003/0036423 A1 2/2003 Vancura
2003/0060266 A1 3/2003 Baerlocher
2003/0078093 A1 * 4/2003 Simms ............ G07F 17/32 463/20
2003/0094756 A1 * 5/2003 Grauzer ............ A63F 1/12 273/149 R
2003/0104853 A1 6/2003 Tessmer et al.
2003/0216170 A1 11/2003 Walker et al.
2004/0023715 A1 * 2/2004 Luciano, Jr. ............ G07F 17/32 463/25
2004/0036214 A1 * 2/2004 Baker ............ A63F 1/12 273/149 R
2004/0038735 A1 2/2004 Steil et al.
2004/0053668 A1 * 3/2004 Baerlocher ............ G07F 17/3262 463/18
2004/0053678 A1 * 3/2004 Savio ............ G07F 17/32 463/20
2004/0053679 A1 * 3/2004 Getz ............ G07F 17/32 463/20
2004/0053683 A1 * 3/2004 Hartl ............ G07F 17/32 463/25
2004/0121838 A1 * 6/2004 Hughs-Baird ............ G07F 17/32 463/25
2006/0030396 A1 * 2/2006 Marks ............ G07F 17/34 463/20

FOREIGN PATENT DOCUMENTS

AU A-63553/98 10/1998
EP 0 798 676 10/1997
EP 0 874 337 10/1998
EP 0 926 645 6/1999
EP 0 944 030 9/1999
GB 2 153 572 8/1985
GB 2 328 311 2/1999
GB 2 387 703 10/2003
WO WO 00 12186 3/2000
WO WO 03 075235 9/2003

OTHER PUBLICATIONS

Bally Slot Machines Electro-Mechanicals 1964-1980 Book [In Part], Revised 3rd Edition written by Marshall Fey, cover page and p. 25 (2 pages).
Black Swan Paytable Display written by IGT, published prior to Dec. 2001 (1 page).
Bonus Times article written by Bally Gaming, published in 2000 (1 page).
Field Testing New Slots Article, written by Strictly Slots, published in Jul. 2000 (3 pages).
Good Times brochure written by IGT, published in 1999 (1 page).
Leopard Spots™ (website) written by www.igt.com, printed Mar. 21, 2001 (2 pages).
Mega Multiplier® (website) written by www.wmsgaming com, printed May 22, 2001 (2 pages).
Polly & Roger Brochure written by VLC, Inc, published in 2000 (2 pages).
Slot Machines a Pictorial History of the First 100 Years (pp. 216, 242 to 243), 5th edition written by Marshall Fey, published in 1983-1997 (5 pages).
Take Your Pick Article written by Strictly Slots, published in Mar. 2001 (1 page).
Top Cat Brochure written by WMS Gaming, Inc., published date not known (2 pages).
Treasure Tunnel, Treasure Wheel Brochure written by Sigma Game, Inc., published date unknown (2 pages).
X Factor Brochure and Website Page written by WMS Gaming, Inc., published in 1998 (3 pages).
Yahtzee Video Game Advertisement, written by Mikohn Winning Solutions Worldwide, published 1999 (2 pages).

* cited by examiner

FIG. 5

| | CREDITS WAGERED IN BASE GAME (60) | MULTIPLIER OF BONUS GAME AWARD (62) | BONUS GAME AWARD (64) | TOTAL AWARD (66) |
|---|---|---|---|---|
| 80a SCENARIO 1 | 1 | 1X | A = 10 | 10 |
| SCENARIO 2 | 1 | 1X | B = 20 | 20 |
| SCENARIO 3 | 1 | 1X | C = 30 | 30 |
| 80b SCENARIO 4 | 2 | 2X | A = 10 | 20 |
| 80c SCENARIO 5 | 2 | 2X | B = 20 | 40 |
| SCENARIO 6 | 2 | 2X | C = 30 | 60 |
| SCENARIO 7 | 3 | 3X | A = 10 | 30 |
| SCENARIO 8 | 3 | 3X | B = 20 | 60 |
| SCENARIO 9 | 3 | 3X | C = 30 | 90 |

FIG. 6A

| DISTRIBUTION TABLE OF PROBABILITIES ASSOCIATED WITH INDIVIDUAL MULTIPLIERS BASED ON CREDITS WAGERED IN BASE GAME | | | |
|---|---|---|---|
| | MULTIPLIERS OF BONUS GAME AWARD (62) | | |
| CREDITS WAGERED IN BASE GAME (60) | 1X | 2X | 3X |
| 1 CREDIT | 60% | 30% | 10% |
| 2 CREDITS | 30% | 60% | 10% |
| 3 CREDITS | 10% | 30% | 60% |

FIG. 6B

DISTRIBUTION TABLE OF PROBABILITIES ASSOCIATED WITH GROUPS OF MULTIPLIERS BASED ON CREDITS WAGERED IN BASE GAME

| CREDITS WAGERED IN BASE GAME (60) | GROUPS OF MULTIPLIERS OF BONUS GAME AWARD (68) | | |
|---|---|---|---|
| | 1X, 2X, 3X (68a) | 2X, 3X, 4X (68b) | 3X, 4X, 5X (68c) |
| 1 CREDIT | 60% | 30% | 10% |
| 2 CREDITS | 30% | 60% | 10% |
| 3 CREDITS | 10% | 30% | 60% |

FIG. 9

| 82a | CREDITS WAGERED IN BASE GAME (60) | MULTIPLIER OF BONUS GAME AWARD PER CREDIT WAGERED IN BASE GAME (62) | MULTIPLIED BONUS GAME AWARD (64) | TOTAL AWARD (66) |
|---|---|---|---|---|
| SCENARIO 1 | 1 | 1X | A = 10 | 10 |
| SCENARIO 2 | 1 | 1X | B = 20 | 20 |
| SCENARIO 3 | 1 | 1X | C = 30 | 30 |
| SCENARIO 4 | 2 | 2X | A = 20 | 40 |
| SCENARIO 5 | 2 | 2X | B = 40 | 80 |
| SCENARIO 6 | 2 | 2X | C = 60 | 120 |
| SCENARIO 7 | 3 | 3X | A = 30 | 90 |
| SCENARIO 8 | 3 | 3X | B = 60 | 180 |
| SCENARIO 9 | 3 | 3X | C = 90 | 270 |

GAMING DEVICE HAVING A GRADUATED MULTIPLIER PAYOUT IN A SECONDARY GAME

PRIORITY CLAIM

This application is a continuation of, and claims priority to and the benefit of, U.S. patent application Ser. No. 13/732,769, filed on Jan. 2, 2013, which is a divisional of, and claims priority to and the benefit of, U.S. patent application Ser. No. 12/030,720, filed on Feb. 13, 2008, which issued as U.S. Pat. No. 8,360,848 on Jan. 29, 2013, which is a continuation of, and claims priority to and the benefit of, U.S. patent application Ser. No. 10/452,388, filed on Jun. 2, 2003, which issued as U.S. Pat. No. 7,338,370 on Mar. 4, 2008, the entire contents of each of which are hereby incorporated by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming devices such as slot machines have achieved a predominant presence in the gaming industry. A measure of their success can be attributed to the creative ways of providing an award to a player making a wager of value and the accompanying audio and visual presentations to create a unique, thematic, and exciting gaming experience for the player. Slot machines are no longer limited to a base game of pulling a handle to spin reels in order to line up winning symbols on a single payline. Gaming devices now have bonus games, bonus symbols, and other ways of winning or increasing an award, thereby, increasing the excitement for the player.

The secondary or bonus game can be an extension of the primary or base game or a separate game altogether with a different theme. Besides generating an award in the base game, the presence of a particular symbol or predetermined combination of symbols on a payline may also initiate a bonus game. This triggering event temporarily stalls the base game and transitions from the base game to the bonus game. The bonus game usually provides an award to a player based on play in the bonus game producing a significantly higher level of player excitement than the base game. The bonus game may also be accompanied by more attractive or unique video displays and audio performances. Upon the completion of the bonus game, the player is returned to the base game.

Known slot games have ways for the base game to increase a bonus game award or average expected award or value. One way in which the bonus game award is increased is determined by the method in which the bonus game is initiated. For example, certain wins in bonus games that are triggered by line wins are multiplied by the amount wagered for that line.

One of the ways of providing a larger award to the player is through the use of multipliers. A multiplier increases the award amount in proportion to the value of the multiplier. For example, a “2×” multiplier pays twice the normal award value. A “3×” multiplier pays three times the normal award value. Thus, a multiplier can substantially increase a player’s award. It should be appreciated that multipliers are an effective means of substantially increasing an award and elevating a player’s level of excitement and enjoyment.

Among other scenarios, multipliers can be randomly generated, appear in a winning combination, or be awarded based on the amount of the player’s wager. Moreover, the presence of a multiplier symbol may increase the award earned in an immediate event by the value of the multiplier or be applied to later portions of the game. U.S. Pat. No. 6,004,207, for example, discloses a game that employs an incrementing multiplier that increases throughout the game according to the generation of certain symbols or symbol combinations on the reels and in conjunction with the player betting the maximum amount.

It is desirable for a gaming device to provide an opportunity for the player to enhance the bonus game award based on an increased base game wager and effectively communicate that opportunity to the player in the base game. It has been described in U.S. Pat. No. 6,155,925 to base an increase in the probability of winning in the bonus game on the amount of the wager in the base game according to a series of complex paytables. However, a multiplier advertised in the base game and applied directly to the bonus game award would allow a player to more easily understand the advantages in a bonus game based on the player’s wager in the base game.

SUMMARY

The present invention provides a gaming device having a plurality of different possible value wagers or wagerable amounts in a primary or base game associated with a plurality of different multipliers or other modifiers applied to the bonus award in the secondary or bonus game.

In accordance with one embodiment of the present invention, the gaming device comprises a base game and a bonus game. The base game is played in response to a wager that is some multiple of one or more credits. The gaming device includes the bonus game activated by a bonus triggering event such as the occurrence of a particular bonus triggering symbol or a combination of bonus triggering symbols along an activated payline in the base game. The bonus triggering event causes the processor to shift operation of the gaming device from the base game to the bonus game.

The bonus game multiplier or other modifier associated with the amount of the wager is advertised in the base game presentation allowing the player to directly increase the value of the multiplier or other modifier by increasing the wager. In other words, in one embodiment of the present invention, the larger the wager, the larger the multiplier or other modifier. When the player has placed the bet, the multiplier or modifier corresponding to the wagered amount can be highlighted. It should also be appreciated that the multiplier or other modifier earned in the base game can be displayed or advertised to be selected from a group of multipliers or other modifiers associated with a particular wager.

If the bonus game is triggered, the bonus game can generate an award by having the player select from a series of symbols, spin a wheel with numbers corresponding to the value of an award, or play another reel game, among other methods. The award in the bonus game may then be increased by applying the multiplier or other modifier earned by the player in the base game. In an alternative embodiment, the bonus award is increased by applying the multiplier or other modifier per credit wagered in the base game. In this embodiment, the bonus game award is increased by the multiplier or modifier for each credit wagered in the base game to determine the total award.

It is an advantage of the present invention to increase the amount of a player's total award by applying a multiplier or other modifier to the bonus game award based on the amount of the wager in the base game.

Other objects, features, and advantages of the invention will be apparent from the following detailed disclosure, taken in conjunction with the accompanying sheets of drawings, wherein like numerals refer to like parts, elements, components, steps and processes.

BRIEF DESCRIPTION OF THE FIGURES

FIG. 5 is a table representing the effect of the multiplier on the total award in a bonus game provided in one embodiment of the gaming device of the present invention.

FIGS. 6A and 6B are tables representing a sample distribution of probabilities that determine the likelihood of individual multipliers or groups of multipliers applied to a bonus game award to be associated with a particular wagerable amount in the base game.

FIG. 9 is a table representing an alternative effect of the multiplier on the total award in a bonus game provided in one embodiment of the gaming device of the present invention.

DETAILED DESCRIPTION

Figure 1A:
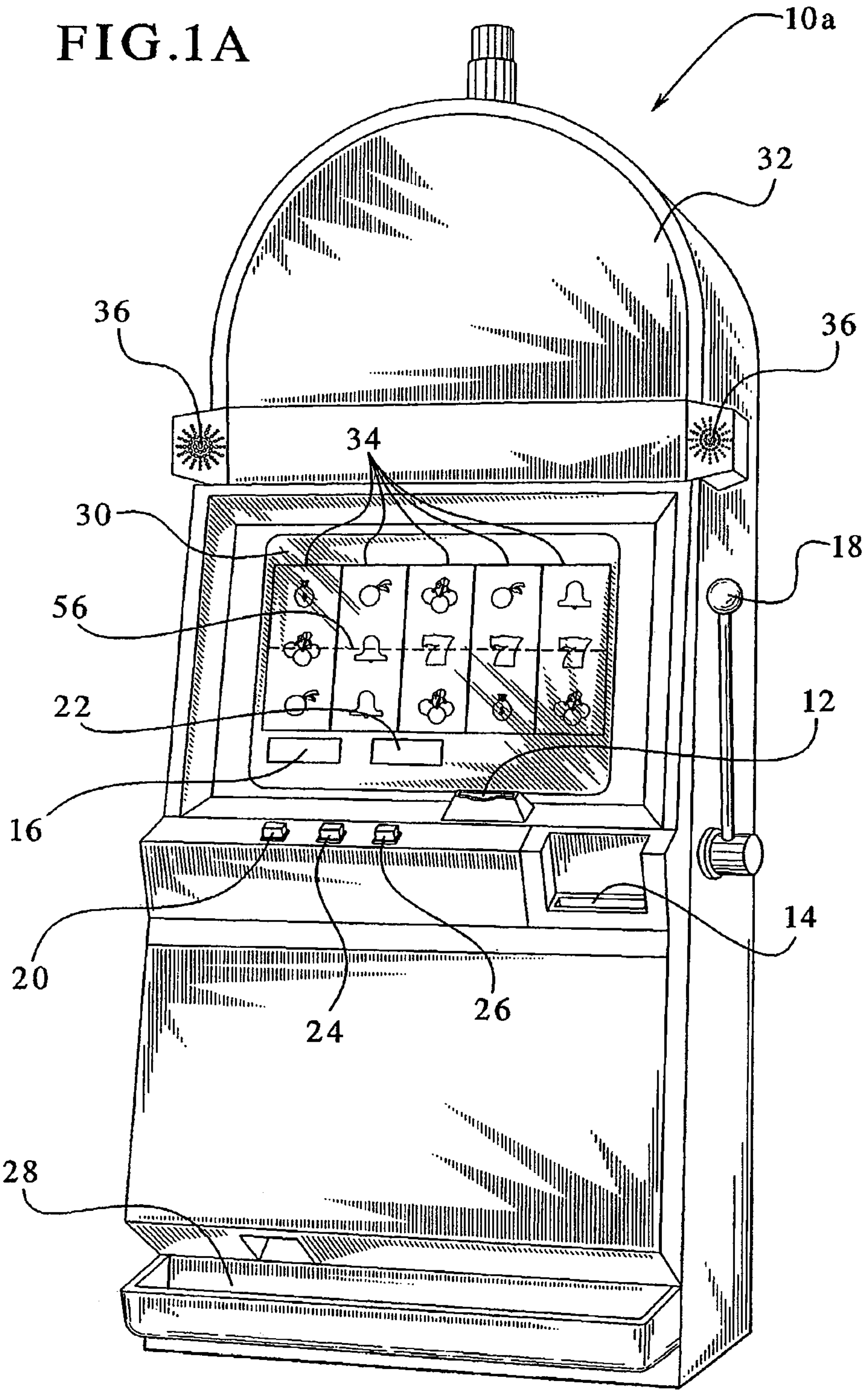
FIG. 1A is a front perspective view of one embodiment of the gaming device of the present invention.
Figure 1B:
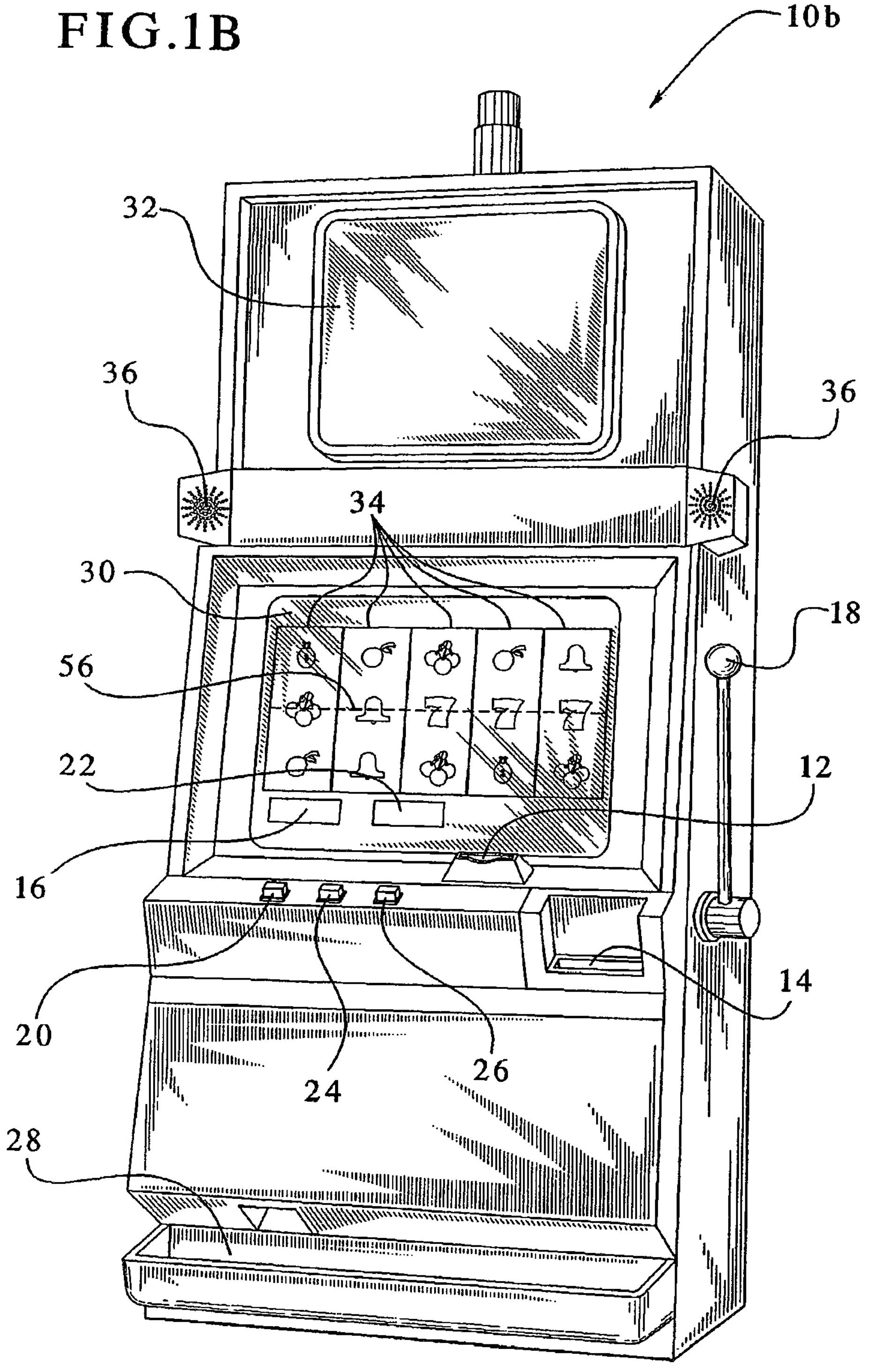
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is, in one embodiment, a slot machine having the controls, displays and features of a conventional slot machine. It is constructed so that a player can operate it while standing or sitting, and gaming device 10 is preferably mounted on a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, any of their bonus triggering events and any of the bonus round games. The symbols and indicia used on and in gaming device 10 may be in mechanical, electronic, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 in one embodiment displays a plurality of reels 34, such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images or symbols which preferably correspond to a theme associated with the gaming device 10. Furthermore, gaming device 10 preferably includes speakers 36 for making sounds or playing music.

Figure 2:
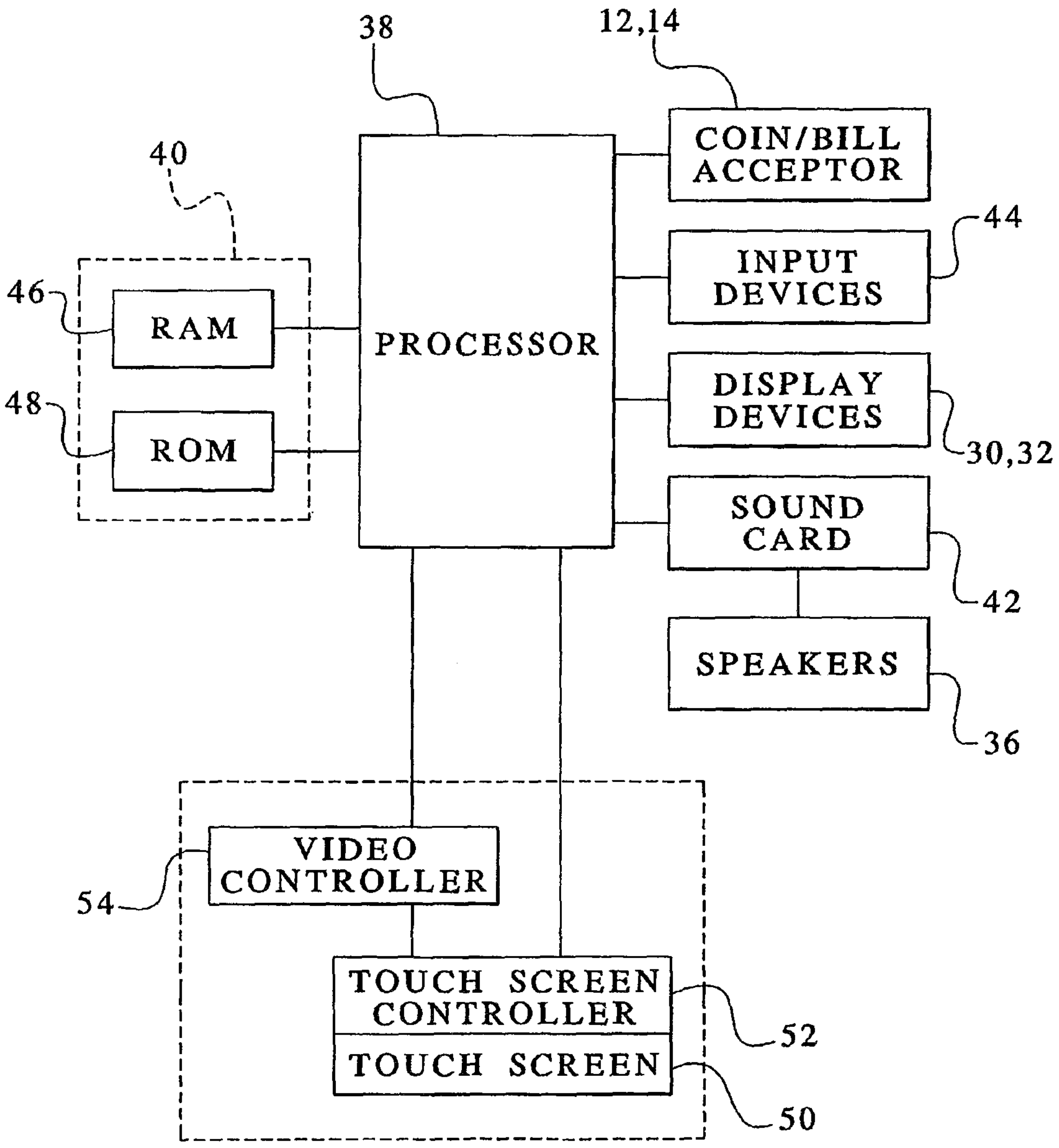
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively, and/or individually, referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 may use a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Figure 3A:
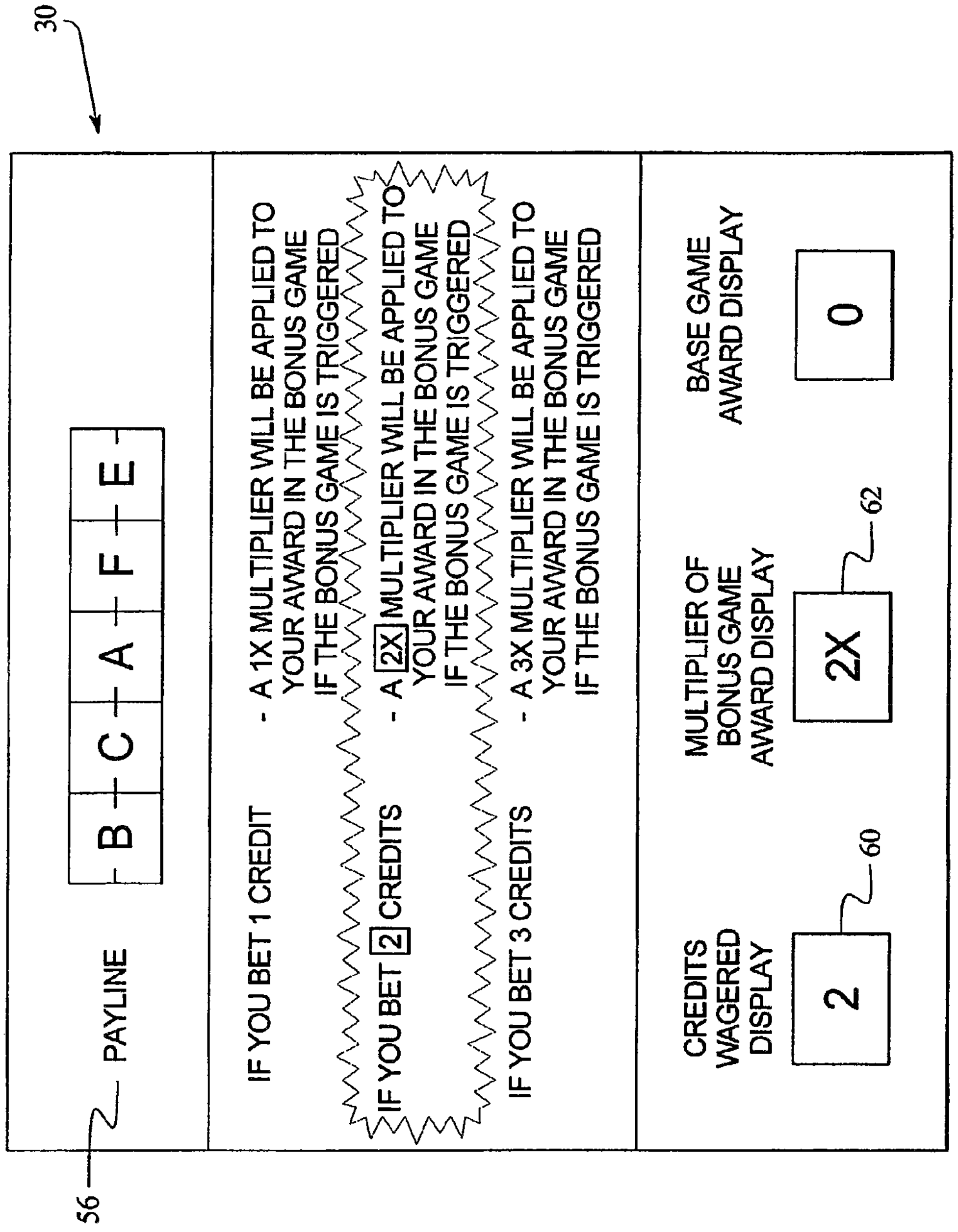
FIGS. 3A and 3B are enlarged front elevation views illustrating a reel-type base game of an embodiment of the gaming device of the present invention.
Figure 3B:
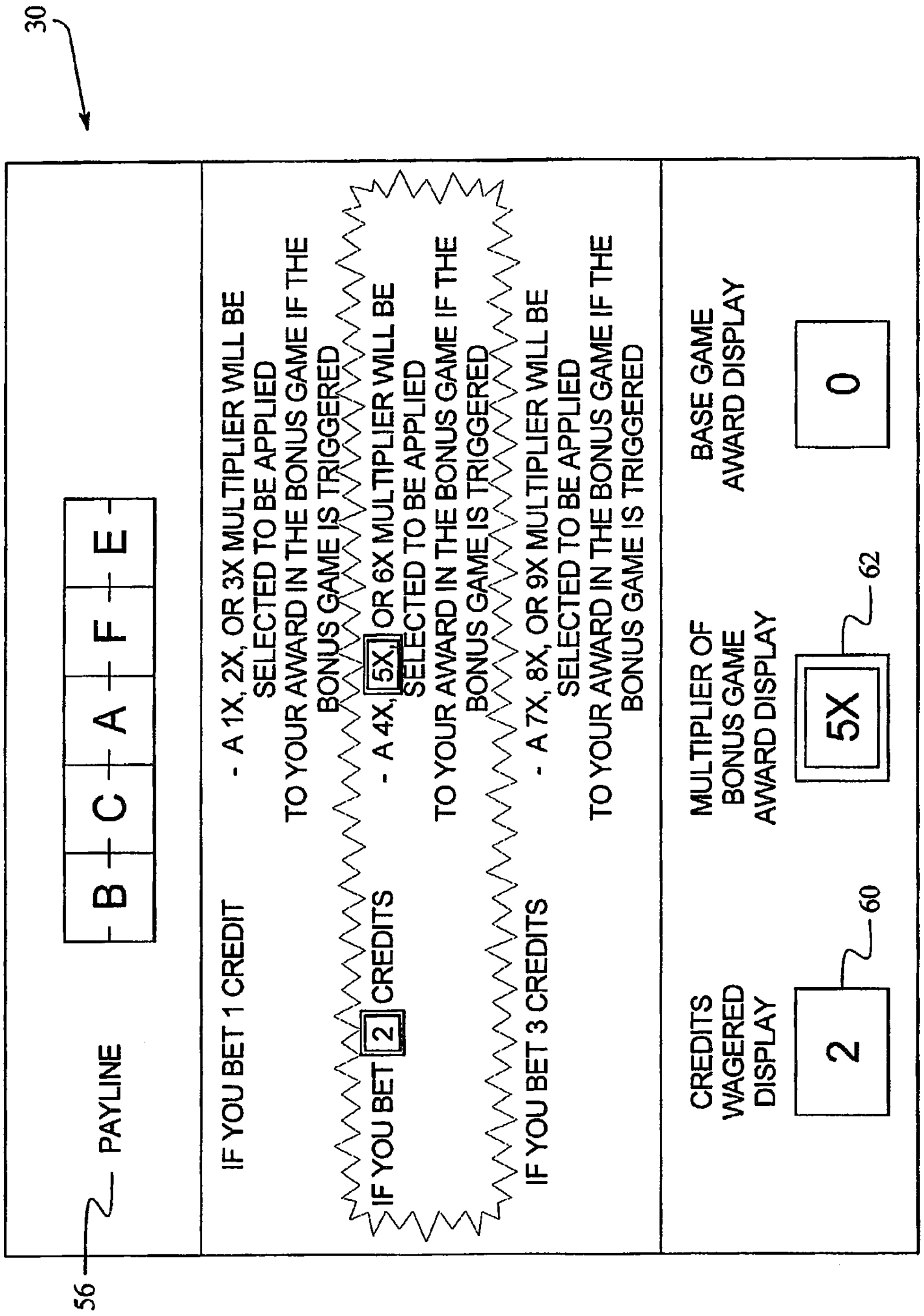

Referring now to FIGS. 3A and 3B, one embodiment of the gaming device of the present invention displays a range of different multipliers 62 associated with the different amounts of the wagers 60 in the base game. The display shows the player what multiplier or range of different multipliers will be provided to the player in the bonus game for each wager or range of wagers made in the base game. FIG. 3A illustrates an example of what the display may show for one of the wagerable amounts as follows: "If you bet 2 credits, a 2× multiplier will be applied to your award in the bonus game if the bonus game is triggered." Thus, in one embodiment of the present invention, the total number of credits wagered 60 in the base game can be the number of credits wagered 60 per activated payline, such as payline 56. For example, if a player wagers one credit on two paylines, a total of two credits are wagered in the base game and a multiplier of 2× is associated with that wager to be applied in the bonus game as illustrated in FIG. 3A. When the player has selected a wagerable amount, the display will highlight the multiplier associated with that wager.

Figure 4A:
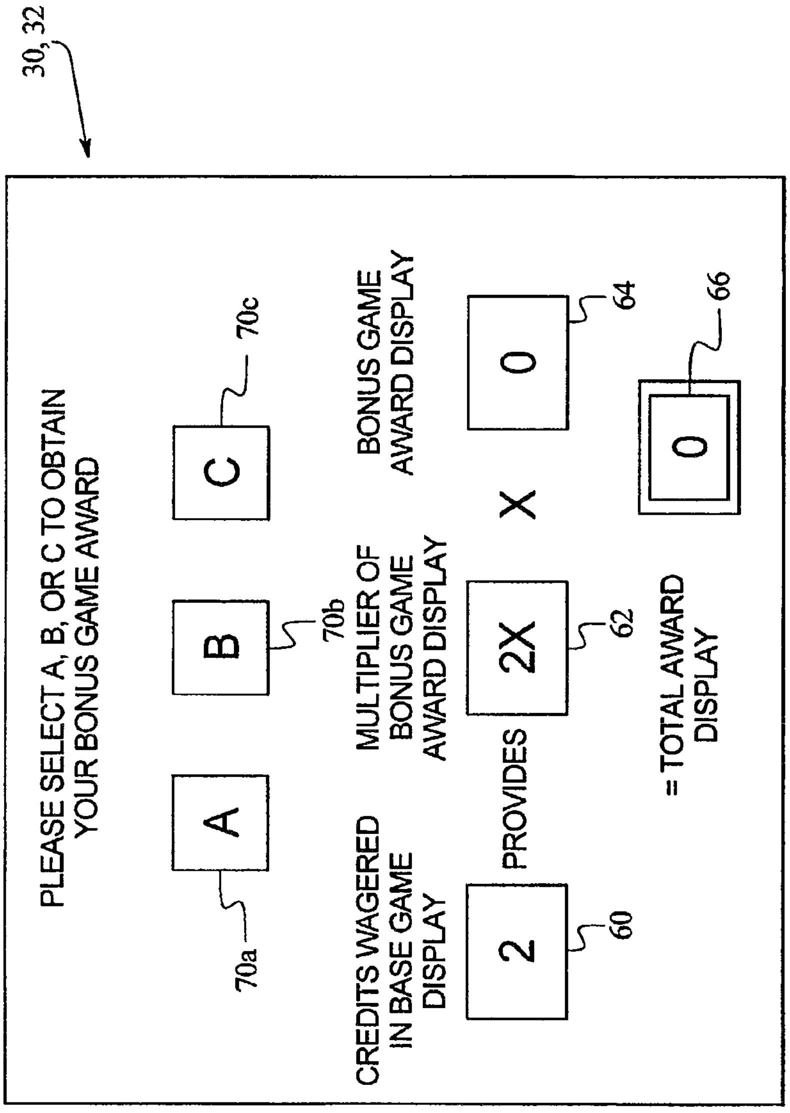
FIGS. 4A and 4B are enlarged front elevation views illustrating a player selection bonus game of an embodiment of the gaming device of the present invention.
Figure 4B:
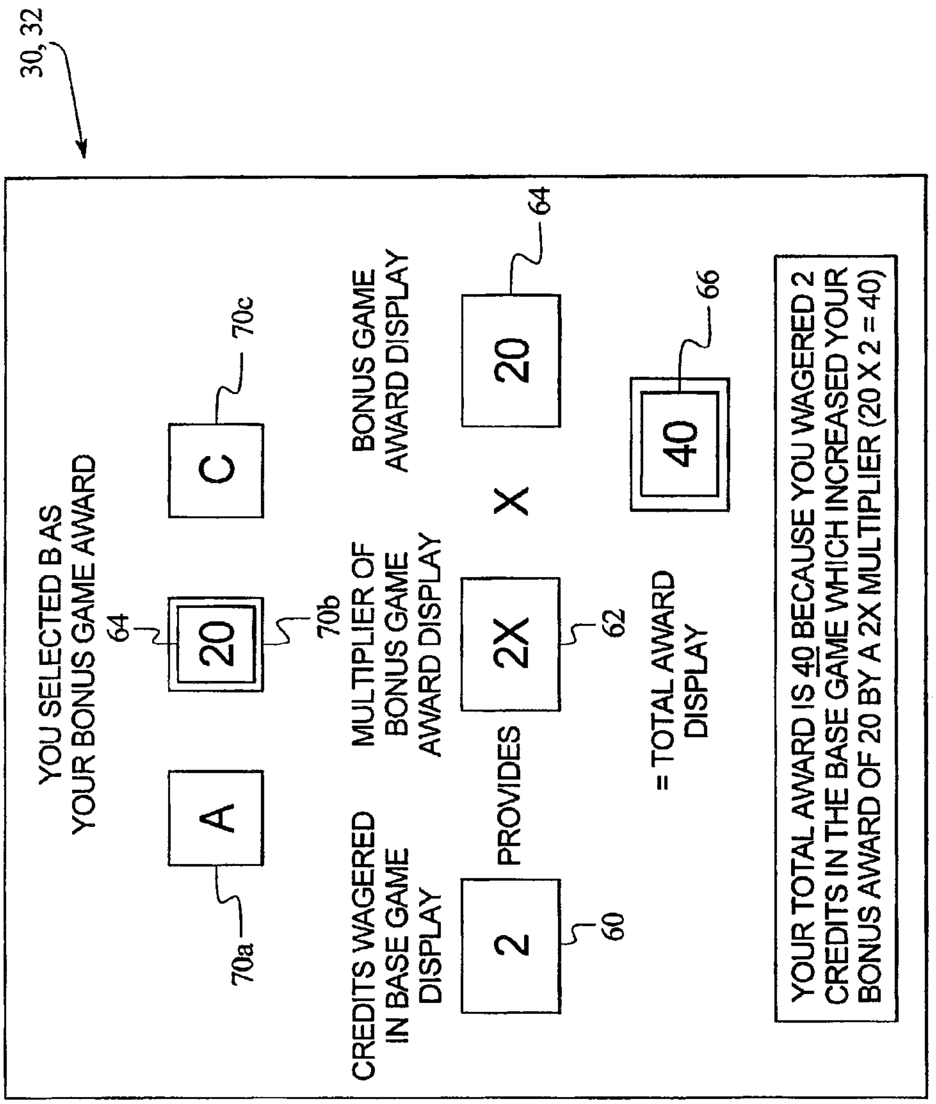

Referring now to FIGS. 4A and 4B, an example of the bonus game of this embodiment is displayed following a transition from the base game of FIG. 3A. The bonus game of FIGS. 4A and 4B is either displayed on the central display device 30 or separately on the upper display device 32 (FIG. 1A or 1B). FIG. 4A generally illustrates the appearance of the bonus game display before the player has selected a bonus symbol. The bonus game display includes three bonus symbols 70*a*, 70*b* and 70*c*, having a predetermined award that is unknown to the player prior to the selection made by the player. The display also reveals the number of total credits wagered 60 in the base game and the multiplier 62 associated with that wager carried over from the base game. It should be appreciated that any suitable pay table or award table may be used in the bonus game. The example in FIG. 4A shows the player to have wagered a total of two credits in the base game that provides a multiplier of "2×" to be applied to the bonus game award. The player is instructed by the display to select one of the bonus symbols 70*a*, 70*b*, or 70*c* to determine the bonus award 64 which is shown in the bonus game award display. At this point in the bonus game, the gaming device awaits the selection by the player to determine the bonus award 64.

FIG. 4B illustrates the appearance of the display 30, 32 upon selection by the player of one of the bonus symbols 70*a*, 70*b*, or 70*c* with the bonus game award 64 being revealed to the player. The player has selected bonus symbol "B," 70*b* and the value of the bonus symbol selected by the player in this example is twenty credits. However, because a multiplier 62 of "2×" is provided to the player in the bonus game based on the wager 60 in the base game, the award 64 is doubled in the bonus game to a total award 66 of forty credits. The display 30 or 32 indicates to the player that "Your Total Award is 40 because you wagered 2 Credits in the Base game which increased your Bonus Award of 20 by a 2× Multiplier."

Referring now to FIG. 5, the example of the embodiment described in FIGS. 4A and 4B has a variety of total award 66 outcomes based on the credits wagered 60 in the base game. The first column 60 of FIG. 5, indicates a range of credits that can be wagered in the base game having a maximum wager of three credits. The second column 62 indicates a range of multipliers that are provided in the bonus game according to the number of credits wagered in the base game. The third column 64 indicates pre-determined values that are randomly associated with each of the bonus game symbols 70*a*, 70*b*, and 70*c*. The fourth column 66 shows a total number of credits provided to the player in the bonus game based on the effect of the multiplier on the bonus game award. The total award 66 is increased based on the number of credits wagered 60 in the base game by means of the multiplier 62.

FIG. 5 illustrates an example of the game with a three-credit maximum bet, wherein betting one credit wins a "1×"

multiplier, betting two credits wins a "2×" multiplier, and betting three credits wins a "3×" multiplier, as set forth in columns 60 and 62. If the bonus game is triggered, the multiplier 62 is used to increase the bonus game award 64 selected by the player or awarded according to a stop position of a wheel or a pay table of a randomly generated event. The increased bonus award 64 for the bonus game becomes the total award 66. Hence, total award 66 of the game is dependent on the amount of the wager 60 in the base game.

In scenario 80*a* of the Table, the player has wagered one credit in the base game (column 60) and has earned a multiplier of the bonus game award of "1×" (column 62). The player or the gaming device selected the bonus symbol "A" in the bonus game that has a bonus game award value of ten credits (column 64). The bonus award 64 is multiplied by the multiplier 62 of "1×" provided in the base game and, thus, the resulting total award 66 earned in the bonus game remains ten credits (column 66). In scenario 80*b*, the player has wagered two credits in the base game (column 60) earning a multiplier of "2×" (column 62) to be applied in the bonus game. The player then earns a bonus game award of ten credits (column 64) which is increased by the multiplier 62 provided in the base game to make the total bonus game award 66 to be twenty credits (column 66). The table of FIG. 5 illustrates the increases in the total award 66 outcomes based on an increased number of credits wagered in the base game employing the multiplier of the bonus game award provided as a result of that wager. Therefore, by increasing the wager in the base game, a player can dramatically increase the total award of the bonus game, thereby enhancing the player's level of excitement in the game.

Variations in associating particular multipliers with a particular wager can occur in accordance with the present invention. In an alternative embodiment illustrated in FIG. 3B, the display 30 can indicate to the player in the base game a group of different multipliers 62 available to the player that are predefined and selected by the player or randomly selected by the processor 38 based on wagered amount 60 in the base game. In accordance with this embodiment, gaming device 10 communicates to the player that a wager 60 of one credit will cause the processor 38 to randomly generate or reveal a predefined multiplier of 1×, 2×, or 3× to be applied in the bonus game. A wager of two credits will cause the processor to randomly generate or reveal a predefined multiplier of 4×, 5×, or 6×, and so on. Once the multiplier is determined, either by a fixed association with a wagered amount or by random determination by the processor based on the player's wager, the display will highlight the multiplier to be applied in the bonus game.

Another variation in associating multipliers with a particular wager, is illustrated in FIGS. 6A and 6B. An alternative embodiment of the gaming device of the present invention includes associating a probability with each multiplier, as illustrated in FIG. 6A, or each group of multipliers, as illustrated in FIG. 6B. The probabilities determine the likelihood the multiplier 62 or group of multipliers 68 will be assigned to a particular wagerable amount in the base game. The multiplier probability will preferably have a mathematical relationship to the wagerable amount such that a high wager will have a greater probability of being assigned a high multiplier. In FIG. 6A, the player has wagered 2 credits in the base game and has a 60% chance of having a 2× multiplier associated with the wager to be applied to the bonus award in the bonus game. It should be appreciated that the probabilities can be adjusted by the game implementor to manipulate the probability that a particular multiplier will be associated with a particular wager.

FIG. 6B illustrates the association of groups of multipliers 68 with a wagered number of credits 60 from which a multiplier 62 to be applied in the bonus game will be subsequently selected. Each group of multipliers can either be completely different from the other groups, containing no multipliers common to the other groups as in FIG. 3B, or partially different from the other groups, containing some multipliers common to the other groups as in FIG. 6B. In FIG. 6B, for example, the 2×, 3×, and 4× multipliers are shared among the three groups of multipliers. Although the association of a group of multipliers 68 with a particular wagered number of credits 60 can be based on a probability, it should be appreciated that the selection from the group of multipliers 68 of the multiplier 62 to be used in the bonus game can be predetermined, randomly determined, or determined based on another layer of probabilities. For instance, in FIG. 6B where a player has made a two-credit wager in the base game, the likelihood that a group of multipliers will be associated with a two-credit wager is 60% for group 68*a* containing 2×, 3× and 4×, 30% for group 68*b* containing 1×, 2× and 3×, and 10% for group 68*c* containing 3×, 4× and 5×. In other words, the player making a two-credit wager in the base game has a 60% chance of selecting a multiplier for use in the bonus game from group 68*b*, a 30% chance of selecting a multiplier for use in the bonus game from group 68*a*, and a 10% chance of selecting a multiplier for use in the bonus game from group 68*c*.

If group 68*a* containing 1×, 2× and 3× is determined to be associated with the wager (a 30% likelihood of occurring in the present example), the individual multiplier 62 to be used in the bonus game may be randomly determined, each multiplier 62 having an equal chance of being selected. Alternatively, the selection of an individual multiplier 62 from the group associated with the wager 60 made by the player may be based on another layer of probability as set forth in the distribution table of FIG. 6A. For example, the 2× multiplier has a 60% chance of being applied to the bonus award in the bonus game if the player wagers two credits in the base game. As set forth in FIG. 6A, a two-credit wager has a 60% probability associated with the 2× multiplier. In other words, the 2× multiplier has a 60% chance of being applied to the bonus award in the bonus game if the player wagers two credits in the base game. Likewise, the 1× multiplier of a two-credit wager has a 30% probability of being used in the bonus game, and the 3× multiplier of a two-credit wager has a 10% probability of being used in the bonus game. Hence, in this embodiment, the probability for the 2× multiplier to be associated with a two-credit wager depends on the probability of a group containing a 2× multiplier to be associated with the two-credit wager and the probability that the 2× multiplier will be selected from that group. It should be appreciated that the association of a group of multipliers may be based on a random determination and the subsequent selection of a multiplier from that group may be based on a probability. Of course, any other combinations of random associations or selections and associations or selections based on a probability may be employed as desired by the implementor.

Figure 7A:
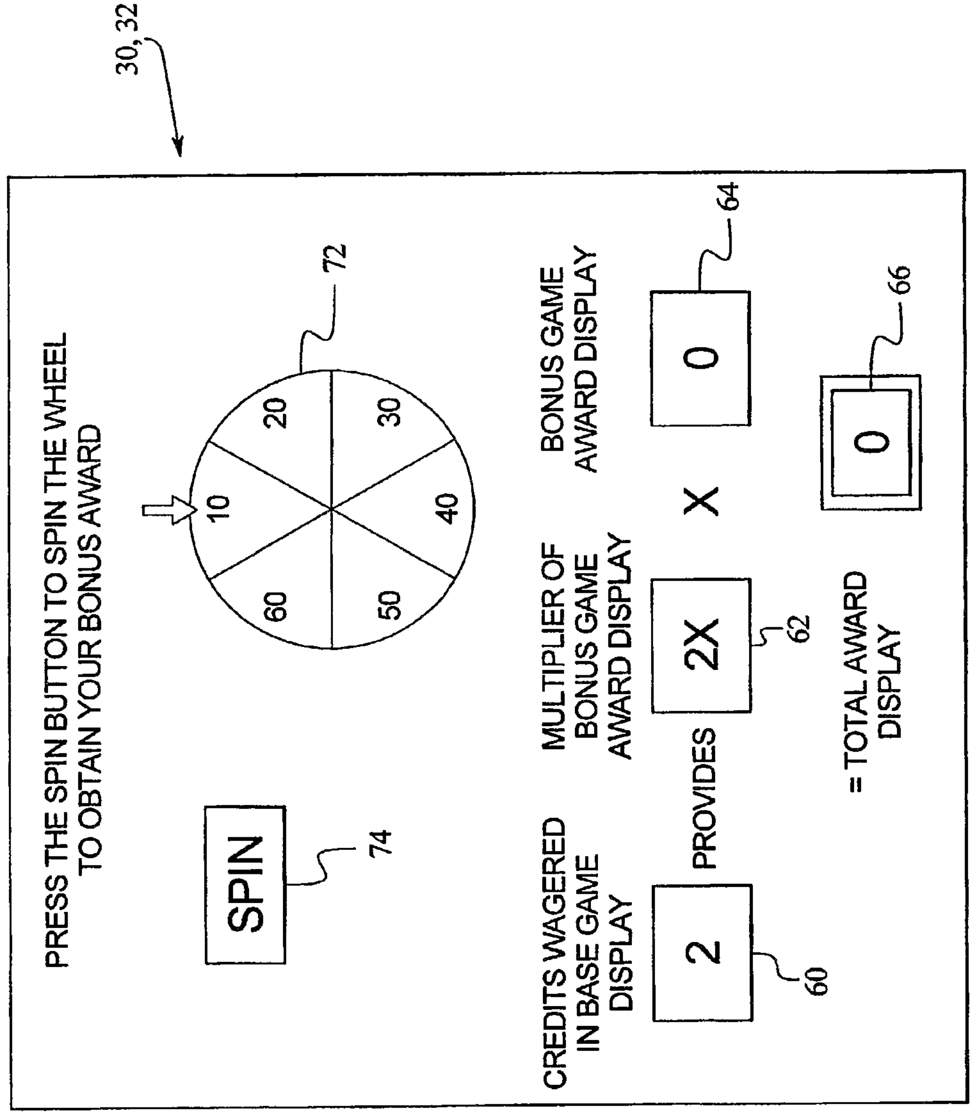
FIGS. 7A and 7B are enlarged front elevation views illustrating a wheel bonus game of an embodiment of the gaming device of the present invention.
Figure 7B:
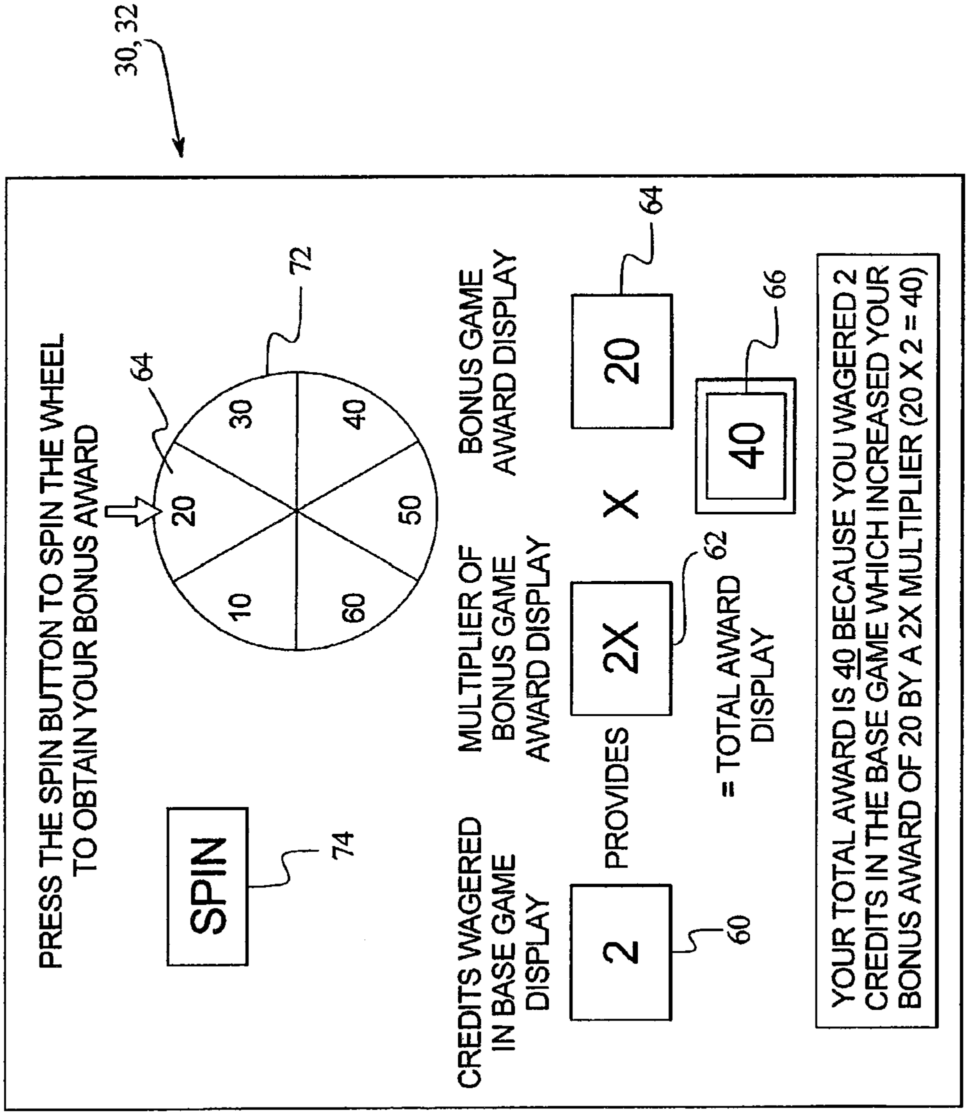

FIGS. 7A and 7B illustrate an alternative embodiment of the present invention employing a wheel 72 to randomly generate an award in the bonus game instead of having the player select a bonus game symbol to determine the bonus game award 64. Like the previous embodiment illustrated in FIGS. 4A and 4B, wheel 72 in the bonus game provides a player a bonus award 64 that is then increased according to the multiplier 62 provided in the base game to provide the player a total award 66 for the bonus game. FIG. 7A illustrates the appearance of display 30 or 32 before the player has spun wheel 72. Display 30 or 32 indicates the number of credits wagered 60 in the base game and the multiplier 62 of the bonus award 64 corresponding to the number of credits wagered 60. The player presses the spin button 74 to set wheel 72 in motion. FIG. 7B illustrates the appearance of the display 30, 32 after wheel 72 has reached a randomly-generated stop position indicating a bonus award 64 of twenty. Again, because the player wagered two credits in the base game earning a "2×" multiplier 62 to be applied in the bonus game, the player's bonus game award 64 of twenty is doubled to a total award 66 of forty. Display 30, 32 indicates to the player that "Your Total Award is 40 because you wagered 2 Credits in the Base game which increased your Bonus Award of 20 by a "2×" multiplier."

Figure 8A:
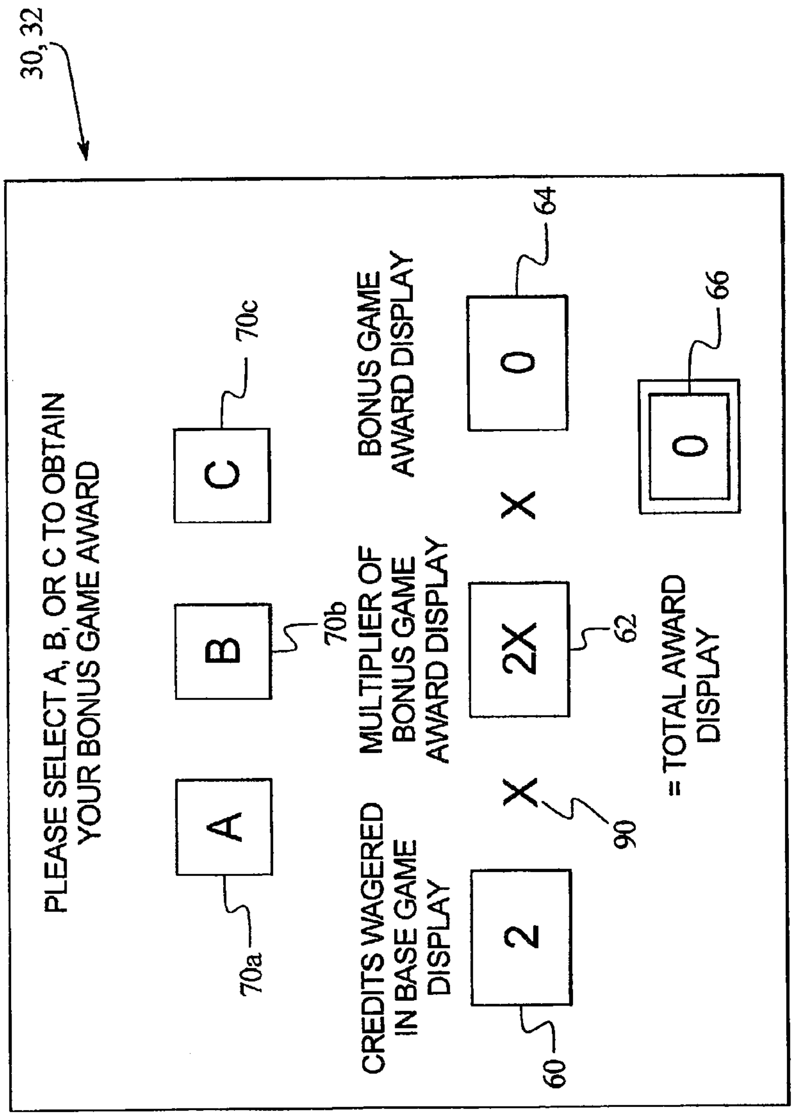
FIGS. 8A and 8B are enlarged front elevation views of an alternative effect of the multiplier on the total award in a player selection bonus game provided in an embodiment of gaming device of the present invention.
Figure 8B:
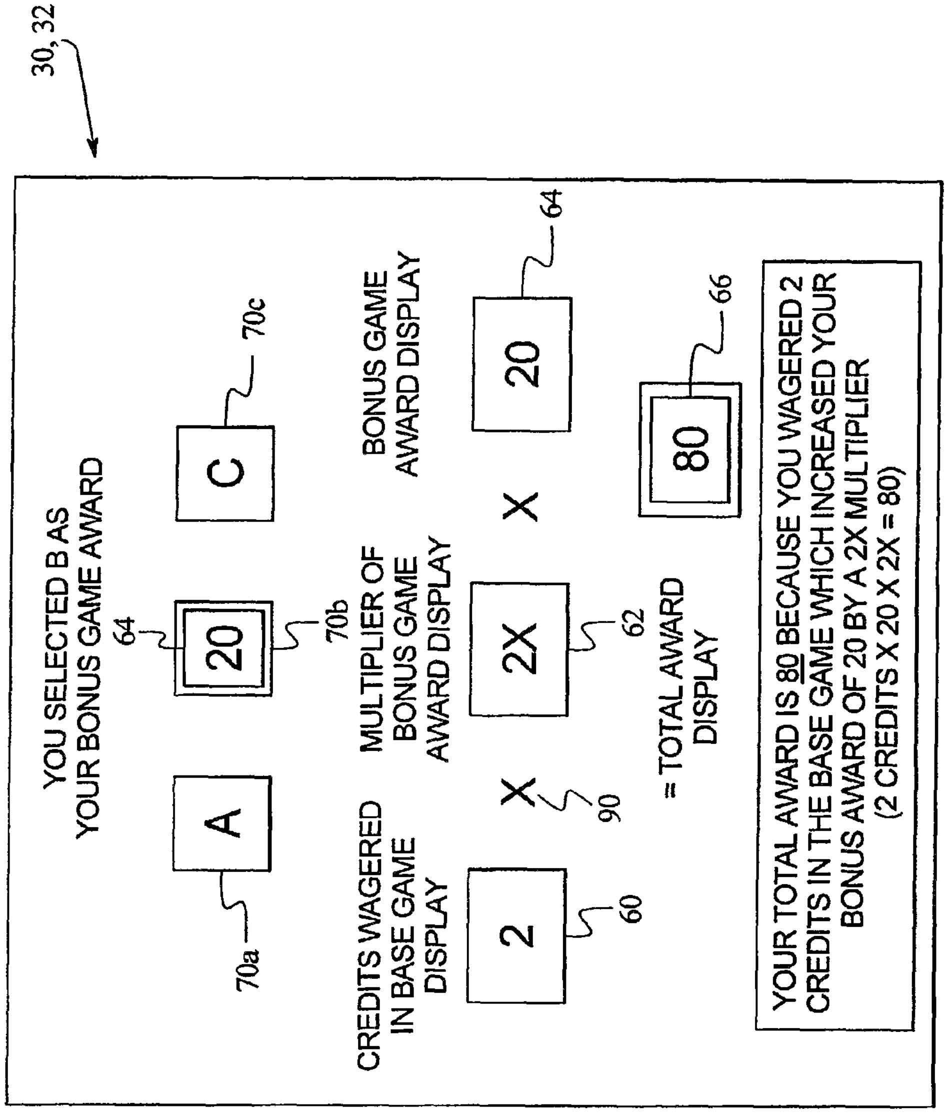

Referring now to FIGS. 8A and 8B, an alternative embodiment of the gaming device of the present invention is consistent with the base game illustrated in FIG. 3A. This embodiment bases the total award on a bonus award 64 that is not only increased by a multiplier 62 but is awarded for each credit wagered in the base game 60. FIG. 8A shows the appearance of display 30 or 32 before the player selects a bonus symbol 58 to determine the bonus award 64. Display 30 or 32 shows the credits wagered 60 in the base game of two credits and the multiplier 62 of the base game award 64 of "2×". The multiplication sign 90 between the "Credits Wagered in the Base Game" display and the "Multiplier of the Bonus Game Award" display indicates to the player that the bonus award 64 will be increased by the multiplier 62 per credit wagered 60.

FIG. 8B illustrates the display after the player has selected the bonus symbol 70*a*, 70*b*, or 70*c*. In FIG. 7B, the player has selected bonus symbol "B" 70*b* receiving a bonus game award 64 of twenty credits. The bonus award 64 of twenty credits per credit wagered 60 in the base game is increased by a "2×" multiplier 62 to provide a total award 66 for the bonus game of eighty credits. The display indicates to the player that "Your Total Award is 80 credits because you wagered 2 Credits in the base game which increased by a '2×' multiplier your bonus award of 20 per credit wagered."

FIG. 9 illustrates a table of a variety of total award outcomes based on the wager in a base game in which the bonus award is applied to each credit wagered in the base game of FIG. 3A. In FIG. 9, the first column 60 sets forth the range of wager amounts to be played in a three-credit maximum bet base game. The second column 62 indicates the particular multipliers associated with each credit wagered in a base game. The third column 64 provides the value of player-selectable elements in a bonus game once the values have been applied per credit wagered in the base game. The fourth column 66 demonstrates the effect of a multiplier applied to the bonus game award that is awarded for each credit wagered in the base game.

In contrast to the embodiment in FIGS. 4A and 4B, the embodiment of FIGS. 8A and 8B as illustrated in FIG. 9 provides the player a total award 66 based on a multiplier provided to the player for each credit wagered 60 in the base game. A multiplier or modifier can be awarded per credit wagered or a multiplied or modified bonus game award can be awarded per credit wagered. In Scenario 82*a* of FIG. 9, the player has wagered two credits in the base game (column 60) earning a multiplier of "2×" per credit wagered in the base game (column 62) to be applied to the bonus award. In the bonus game, the player selected or earned a bonus award of twenty credits from a bonus award-generating game known in the art.

In one variation of this embodiment, the multipliers or other modifiers provided to the player for each credit wagered in the base game are combined before they are applied to the bonus award of the bonus game. For example, the "2×" multiplier provided to the player for each credit wagered in Scenario 82*a* becomes a 4× multiplier (2 credits wagered×2× multiplier for each credit) to be applied to the bonus game award. Because the bonus game award is twenty credits (see FIG. 8B), the total award is eighty credits (4× multiplier×bonus award of 20).

In an another variation of this embodiment, a multiplier or another modifier provided to the player based on the number of credits wagered in the base game can be applied to the bonus award to produce a multiplied or modified bonus award before determining the bonus award for each credit wagered in the base game. In Scenario 82*a* of FIG. 9, the bonus award is multiplied by the 2× multiplier (column 62) to yield a multiplied bonus award of forty credits (column 64) and, because two credits were wagered in the base game (column 60), the total award is eighty credits (column 66).

The same player wagering two credits and winning a twenty credit bonus award in the embodiment of FIGS. 4A and 4B who won a total of 40 credits as illustrated in Scenario 80*c* in FIG. 5 would, in the embodiment of FIGS. 8A and 8B, win a total of 80 credits as illustrated in FIG. 9. As a result, the level of excitement for the player is even greater when a multiplier or modifier is awarded per credit wagered.

It should be appreciated that the present invention could be employed in other games such as poker, blackjack, keno and other primary or secondary games. Furthermore, it should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a housing;

a plurality of input devices supported by the housing and including an acceptor;

at least one display device supported by the housing;

at least one processor; and at least one memory device that stores a plurality of instructions that, when executed by the at least one processor, cause the at least one processor to operate with the plurality of input devices and the at least one display device to:

(a) establish a credit balance based at least in part on a monetary value associated with a physical item after the acceptor receives the physical item;

(b) in response to receiving an input associated with one of a plurality of different wager amounts, place a wager on a play of a primary game, the wager having said one of the plurality of different wager amounts, the credit balance being decreasable by the wager amount of the placed wager;

(c) for the play of the primary game, randomly generate and display a primary game outcome;

(d) determine and display any primary game award associated with the primary game outcome, the credit balance increasable by any primary game award;

(e) in response to an occurrence of a triggering event, initiate a play of a bonus game;

(f) during the play of the bonus game:

(1) display a plurality of selections, at least two selections associated with different credit values;

(2) receive a pick of one of the plurality of selections; and (3) if said picked selection is associated with a credit value:

(i) if the wager amount of the placed wager is a first wager amount, use one of a plurality of different modifiers of a first modifier set to modify the credit value, the credit balance being increasable by the modified credit value; and (ii) if the wager amount of the placed wager is a second wager amount different from the first wager amount, use one of a plurality of different modifiers of a second modifier set to modify the credit value, the second modifier set including at least one modifier not included in the first modifier set, the credit balance being increasable by the modified credit value; and (g) initiate a payout associated with the credit balance after receipt of an actuation of a cashout button.

2. The gaming system of claim 1, wherein the second wager amount is greater than the first wager amount.

3. The gaming system of claim 2, wherein a highest modifier of the plurality of different modifiers of the second modifier set is greater than a highest modifier of the plurality of different modifiers of the first modifier set.

4. The gaming system of claim 2, wherein an average of the plurality of different modifiers of the second modifier set is higher than an average of the plurality of different modifiers of the first modifier set.

5. The gaming system of claim 4, wherein a highest modifier of the plurality of different modifiers of the second modifier set is greater than a highest modifier of the plurality of different modifiers of the first modifier set.

6. The gaming system of claim 1, wherein the modifiers are multipliers.

7. The gaming system of claim 1, wherein the plurality of instructions, when executed by the at least one processor, cause the at least one processor to:

(1) if the wager amount of the placed wager is the first wager amount, randomly select one of the plurality of different modifiers of the first modifier set and modify the credit value using the selected modifier; and (2) if the wager amount of the placed wager is the second wager amount, randomly select one of the plurality of different modifiers of the second modifier set and modify the credit award using the selected modifier.

8. The gaming system of claim 7, wherein the second wager amount is greater than the first wager amount.

9. The gaming system of claim 8, wherein a highest modifier of the plurality of different modifiers of the second modifier set is greater than a highest modifier of the plurality of different modifiers of the first modifier set.

10. A method of operating a gaming system, said method comprising:

(a) receiving, by an acceptor supported by a housing of the gaming system, a physical item associated with a monetary value;

(b) after receiving the physical item, establishing, by at least one processor, a credit balance based at least in part on the monetary value associated with the received physical item;

(c) receiving, by at least one input device, an input associated with one of a plurality of different wager amounts;

(d) after receiving the input, placing, by the at least one processor, a wager on a play of a primary game, the wager having said one of the plurality of different wager amounts, the credit balance being decreasable by the wager amount of the placed wager;

(e) for the play of the primary game, randomly generating, by the at least one processor, and displaying, by at least one display device, a primary game outcome;

(f) determining, by the at least one processor, and displaying, by the at least one display device, any primary game award associated with the primary game outcome, the credit balance increasable by any primary game award;

(g) in response to an occurrence of a triggering event, initiating, by the at least one processor, a play of a bonus game;

(h) during the play of the bonus game:

(1) displaying, by the at least one display device, a plurality of selections, at least two selections associated with different credit values;

(2) receiving, by the at least one input device, a pick of one of the plurality of selections; and (3) if said picked selection is associated with a credit value:

(i) if the wager amount of the placed wager is a first wager amount, using, by the at least one processor, one of a plurality of different modifiers of a first modifier set to modify the credit value, the credit balance being increasable by the modified credit value; and (ii) if the wager amount of the placed wager is a second wager amount different from the first wager amount, using, by the at least one processor, one of a plurality of different modifiers of a second modifier set to modify the credit value using the selected modifier, the second modifier set including at least one modifier not included in the first modifier set, the credit balance being increasable by the modified credit value; and (i) receiving, by the at least one input device, a cashout input; and (j) in response to receipt of the cashout input, initiating, by the at least one processor, a payout associated with the credit balance.

11. The method of claim 10, wherein the second wager amount is greater than the first wager amount.

12. The method of claim 11, wherein a highest modifier of the plurality of different modifiers of the second modifier set is greater than a highest modifier of the plurality of different modifiers of the first modifier set.

13. The method of claim 11, wherein an average of the plurality of different modifiers of the second modifier set is higher than an average of the plurality of different modifiers of the first modifier set.

14. The method of claim 13, wherein a highest modifier of the plurality of different modifiers of the second modifier set is greater than a highest modifier of the plurality of different modifiers of the first modifier set.

15. The method of claim 10, wherein the modifiers are multipliers.

16. The method of claim 10, which includes:

(1) if the wager amount of the placed wager is the first wager amount, randomly selecting, by the at least one processor, one of the plurality of different modifiers of the first modifier set and modifying, by the at least one processor, the credit value using the selected modifier; and (2) if the wager amount of the placed wager is the second wager amount, randomly selecting, by the at least one processor, one of the plurality of different modifiers of the second modifier set and modifying, by the at least one processor, the credit value using the selected modifier.

17. The method of claim 16, wherein the second wager amount is greater than the first wager amount.

18. The method of claim 17, wherein a highest modifier of the plurality of different modifiers of the second modifier set is greater than a highest modifier of the plurality of different modifiers of the first modifier set.

19. The method of claim 10, which is at least partially provided through a data network.

20. The method of claim 19, wherein the data network is an internet.

* * * * *